United States Patent Office
3,438,561
Patented Apr. 15, 1969

3,438,561
FRICTION WELDING APPARATUS WITH SHEARING TOOL FOR REMOVING FLASH FORMED DURING WELDING
Marion R. Calton, East Peoria, Ill., assignor to Caterpillar Tractor Co., Peoria, Ill., a corporation of California
Filed Oct. 9, 1967, Ser. No. 673,758
Int. Cl. B23k 1/20
U.S. Cl. 228—13                           5 Claims

ABSTRACT OF THE DISCLOSURE

A shear tool is moved axially relative to friction welded parts to shear off the flash. An inner shear tool is moved within a welded tube to shear off the inner flash, and the welded assembly is moved within an outer shear tool to shear off the outer flash.

Background of the invention

In bonding workpieces by friction welding techniques, for example, as described in U.S. Patent No. 3,273,233, flash is formed about the weld joint. The flash is often undesirable.

Various techniques have been employed to remove the flash. The most common practice is to remove the flash by a separate machining operation. This is time-consuming and costly.

Smoothing mandrels have been placed inside tubular members in an attempt to prevent the formation of the internal flash rings. While such mandrels have been used with success, some weld debris may still be formed and may remain inside the tube. In many instances this would be undesirable.

French Patent No. 1,425,943 describes a technique for removing flash. In the technique described in the French patent a shearing tool is positioned with its cutting edge at the periphery of the weld zone, and hence in the high temperature zone of the workpieces. During the friction welding process, the weld joint moves towards the material which produces the greatest amount of flash. As the weld moves, the immobile shearing tool strips the flash from the materials being joined as the flash is formed. Such a technique provides rough finishes. When fine finishes are desired additional machining operations may still be necessary. In addition, the described stripping technique requires the proper selection of welding parameters to insure that enough flash is formed to cause the welded assembly to shorten enough to move the entire flash area under the shear tool in the course of the weld cycle. In many cases this may not be practical or possible. Furthermore, by positioning the cutting edge of the flash removing tool in the high temperature heat affected zone, it is exposed to high temperatures while in use. The exposure of the cutting edge to such high temperatures can shorten the life of the tool.

Summary of the invention

The present invention relates generally to a friction welding machine having flash removing means operatively associated with the machine. The friction welding machine of the present invention includes a shearing tool. The shearing tool has a cutting edge which is out of the high temperature zone. At the end of the weld cycle, the tool may be moved within the welded assembly (to shear off flash inside a tube) or the welded assembly may be moved within the tool (to shear off outer flash).

It is a primary object of the present invention to remove the flash formed during friction welding processes without having to resort to additional machining operations.

It is a related object of the present invention to remove the flash formed during friction welding processes while the welded assembly is still mounted in the friction welding machine.

Yet another object of the present invention is to leave a fine finish after the flash is removed.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

Figure 1:
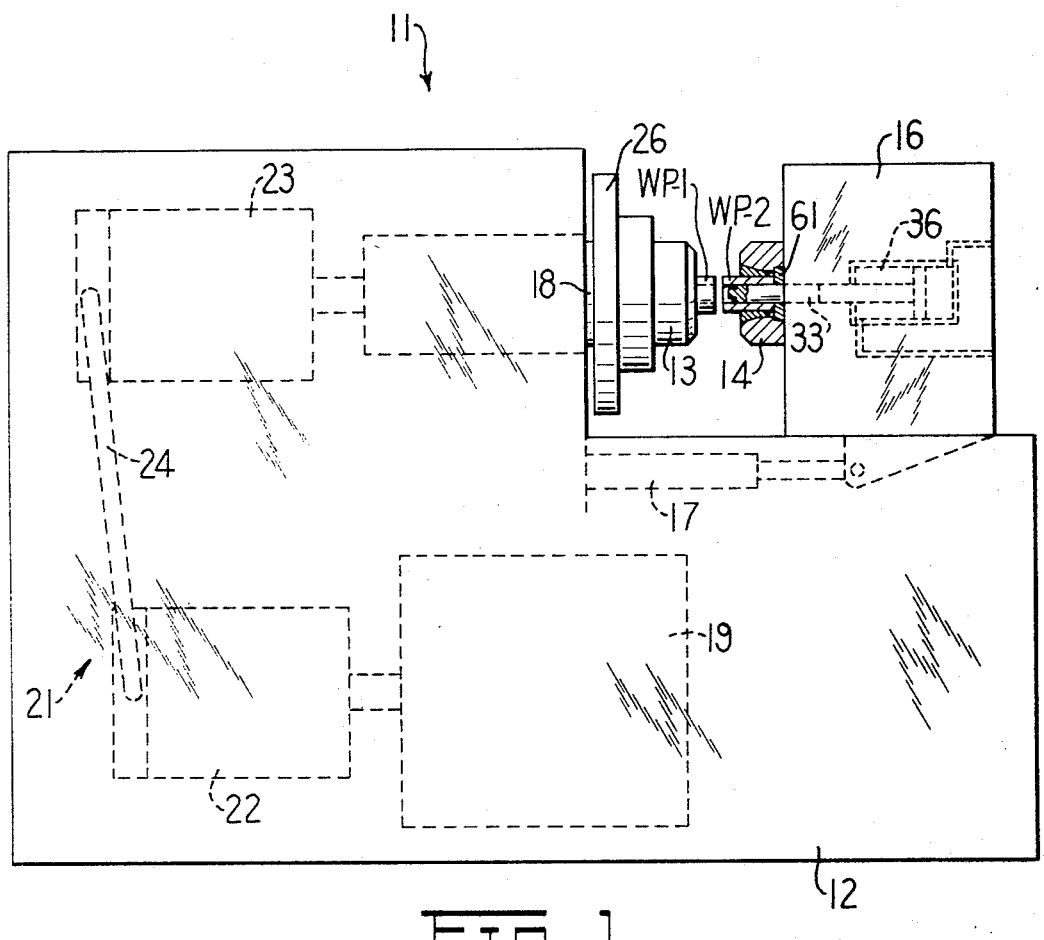
FIG. 1 is a side elevation view of a friction welding machine constructed in accordance with one embodiment of the present invention.

A friction welding machine constructed in accordance with one embodiment of the present invention is indicated generally by the reference numeral 11 in FIG. 1.

The machine 11 has a frame 12.

The two parts to be welded, workpieces WP1 and WP2, are mounted within chucks 13 and 14.

The chuck 14 does not rotate and is mounted on a fixture 16. The fixture 16 is mounted for axial movement on the machine frame 12 under the control of a load cylinder 17. A pressure control circuit, not shown, regulates the pressure in the load cylinder, and thus determines the force with which the parts WP1 and WP2 are engaged.

The chuck 13 is mounted on a spindle 18, and the chuck and spindle are mounted for rotation within the frame 12.

An electric motor 19 rotates the spindle through a hydrostatic transmission indicated generally by the reference numeral 21.

The hydrostatic transmission includes a hydrostatic pump 22, a hydrostatic motor 23, and a manifold 24 between the pump and motor.

The drive ratio between the motor and the spindle 18 can be varied by changing the cam angles in either the pump 22 or the motor 23, and the pump and motor can be used to effectively disconnect the motor 19 from the spindle 18 by moving the cam and the pump 22 to a position in which the pump 22 does not displace any hydraulic fluid to the motor 23.

One or more inertial weights 26 are also mounted on the spindle 18 so that the welding machine 11 can be operated as an inertia welding machine as described in U.S. Patent No. 3,273,233.

Figure 2:
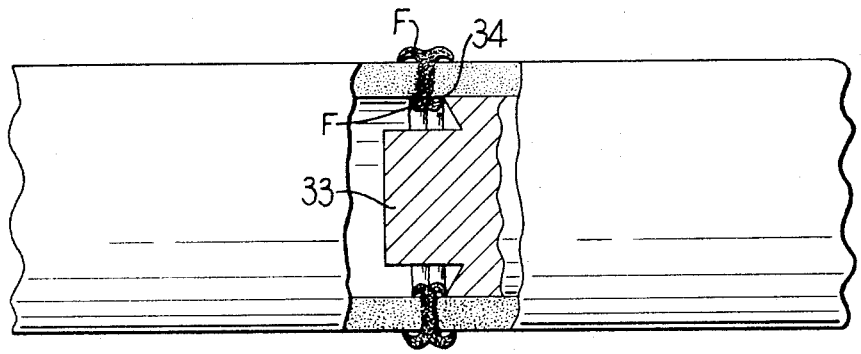
FIG. 2 is a longitudinal section of a particular internal flash shearing tool and portions of two tubular workpieces friction welded together without the internal and external flash removed.
Figure 3:
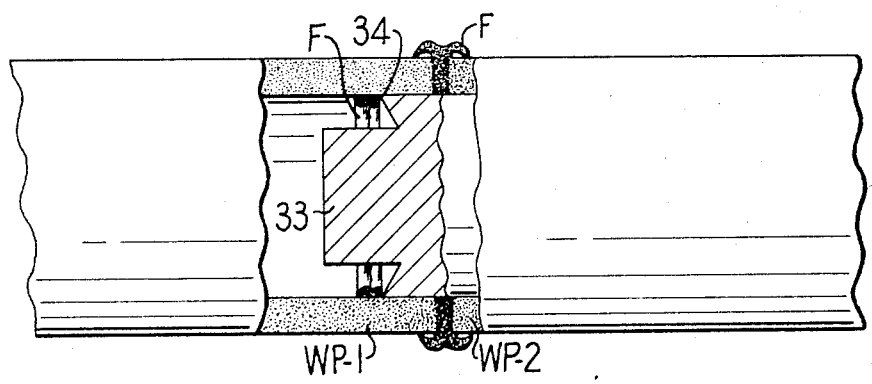
FIG. 3 is a longitudinal section of the flash shearing tool and tubular workpieces of FIG. 2 with the internal flash removed.

To remove internal flash F formed when friction welding tubular-type workpieces WP1 and WP2 the machine 11 has a shear tool 33. The tool 33 is a circular rod of tool steel having a diameter slightly less, e.g., about 0.010 inch, than the internal diameter of the tubular workpieces being joined. This difference in diameters allows relative movement between the tool 33 and workpieces WP1 and WP2. The shear tool 33 has an annular cutting edge 34 (see FIGS. 2 and 3).

The tool 33 is driven by a fluid motor 36. In the position illustrated in FIG. 1 the annular cutting edge 34 of the shearing tool 33 is outside the zone in which the high temperatures are generated during the friction welding operation. In the position shown in FIG. 3 the motor has driven the tool 33 to shear off the internal flash F.

Figure 4:
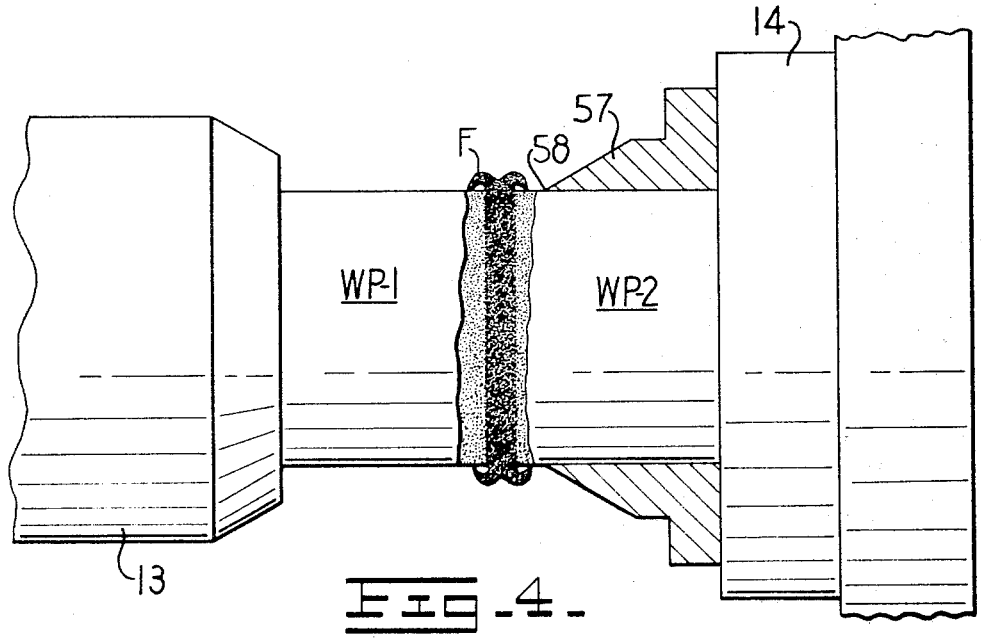
FIG. 4 is a longitudinal section of an external flash shearing tool mounted to a friction welding machine showing two bar members friction welded together without the external flash removed.

External as well as internal flash is formed when friction welding tubular workpieces WP1 and WP2. The external flash F is removed by a tubular shear tool 57 of tool steel mounted to surround the workpieces. As illustrated in FIG. 4 the shearing tool 57 has a cutting edge 58 at one of its ends. The tool 57 is secured to the chuck 14 with its cutting edge located outside the high temperature zone. In order that the workpieces and shearing tool 57 can be moved easily relative to one another, the inside diameter of the shearing tool 57 is made slightly larger, about 0.010 inch, than this outside diameter of the workpieces WP1 and WP2.

Figure 5:
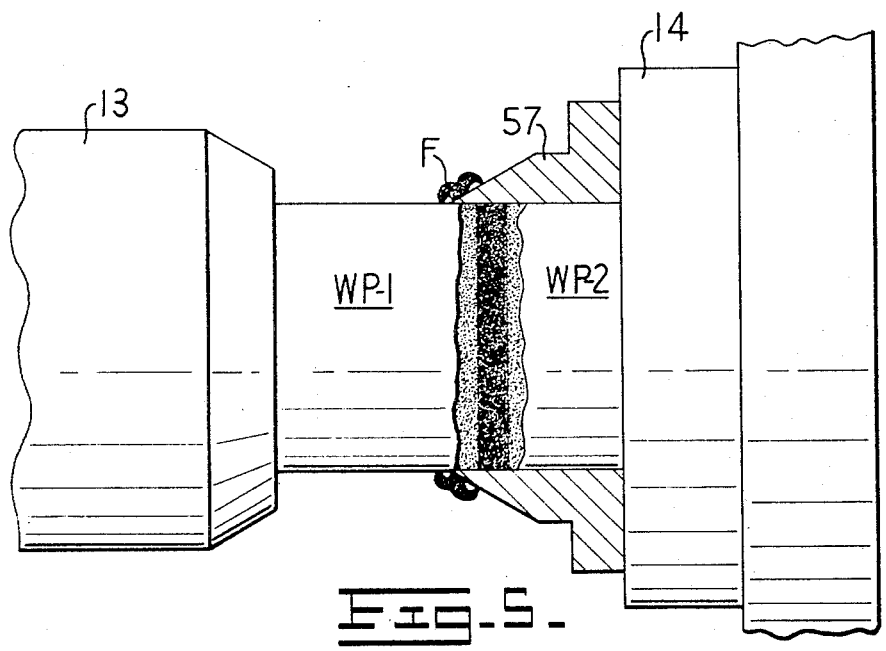
FIG. 5 is a longitudinal section of the flash shearing tool and bar members of FIG. 4 with the external flash removed.

In the embodiment shown in FIGS. 4 and 5, the shearing tool 57 is held stationary while the welded assembly is pushed under the cutting edge 58. To accomplish shearing the chuck 14 is released to allow the welded workpieces to slide within the chuck. At the same time a back-up member 61 (see FIG. 1) inside the chuck 14 may be retracted so that the welded assembly can slide within the fixture 16. A force is then applied by the load cylinder 17 to cause the welded assembly to slide under the shear tool 57, to the position indicated in FIG. 5, to shear off the flash F.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:
1. A friction welding machine of the kind in which two parts are pressed together at a common interface in rubbing contact until flash is extruded radially from the interface, said machine including a shear tool having a cutting edge for removing the flash formed on a surface of the welded parts and means for moving the shear tool relative to the parts to shear off the flash.

2. A friction welding machine as defined in claim 1 wherein the cutting edge is located at least ⅛ inch from the interface of the parts to be joined when the parts are first engaged.

3. A friction welding machine as defined in claim 1 wherein the parts are tubular parts and the shear tool is a rod shaped member inserted inside the tubular shaped parts to extend along the tube axis, and said means move the shear tool within the welded tube.

4. A friction welding machine as defined in claim 1 wherein the parts are cylindrical parts and the shear tool is a tubular tool which shears off the outer flash.

5. A friction welding machine as defined in claim 4 wherein the welded assembly is moved within the shear tool to shear off the flash.

References Cited

UNITED STATES PATENTS

| | | | |
|---|---|---|---|
| 2,124,849 | 7/1938 | Drain | 219—97 |
| 3,036,202 | 5/1962 | Stieglitz | 219—97 |
| 3,259,969 | 7/1966 | Tessmann | 219—100 |
| 3,268,247 | 8/1966 | Murphrell | 219—100 |
| 3,352,995 | 11/1967 | Lesley | 219—160 |
| 2,120,316 | 6/1938 | Stone | 29—33 |

RICHARD H. EANES, Jr., *Primary Examiner.*